Patented Oct. 11, 1938

2,133,257

UNITED STATES PATENT OFFICE 2,133,257

POLYMERIZATION PROCESS

Daniel E. Strain, Wilmington, Del., assignor to E. I. du Pont de Nemours & Company, Wilmington, Del., a corporation of Delaware No Drawing. Application April 10, 1935,
Serial No. 15,668

20 Claims. (Cl. 260—2)

This invention relates to the production of plastic materials by polymerization and more particularly to a new and improved method of polymerizing unsaturated organic compounds e. g. acrylic acid, methacrylic acid, their homologues, esters and other derivatives or mixtures thereof.

The control of polymerization of the above general class of compounds is rendered difficult since it is often accompanied by considerable development of heat, and, as the temperature affects the polymerization, it is difficult, by the mere direct application of heat in the presence or absence of suitable catalysts, to regulate the polymerization in order to obtain a fully polymerized product in a suitable form.

Various methods have been proposed to overcome these difficulties due to polymerization such, for example, as the emulsion polymerization processes described in British Patents 358,534 and 374,436, and the granular polymerization process disclosed in the copending U. S. applications of Crawford et al., Serial Nos. 749,500 filed October 22, 1934 and 12,728 filed March 23, 1935. When polymerizing in accord with the processes therein disclosed, an emulsifying agent or colloid is required in order to effect dispersion of the particles during their polymerization. After the polymerization no attempt is made to remove the colloid or other type of emulsifying agent employed and, due to the small percentage of these agents used, thorough removal would be very difficult.

Because of the residual emulsifying agent left in the polymerized product it has been found that the value of the finished resin for many commercial uses is greatly lowered. This is particularly true when the resin is molded or otherwise shaped into a form which must have good strength. Investigation has shown that, generally speaking, the resin produced by processes not involving the use of emulsifying agents hitherto used has considerably greater strength than the resin obtained when the agent is present. However, due to the desirable physical form of the polymerized product when produced by the above processes the presence of residual emulsifying agent is practically unavoidable if this form of product is produced.

An object of the present invention is to provide a polymerization process wherein a monomeric polymerizable compound is dispersed prior to polymerization by a new and improved emulsifying agent. Another object of the invention is to provide a polymerization process wherein compounds are polymerized in emulsion or dispersed form and the finished resin shows none of the above disadvantages. A further object of the invention is to provide a process for the polymerization of the unsaturated organic esters and more particularly the alkyl esters of acrylic acid, methacrylic acid, or their homologues or derivatives or mixtures thereof by effecting the polymerization of these compounds in the presence of an emulsifying agent, which is also a thermoplastic or combines with the compound to give a thermoplastic or which is a water soluble derivative of acrylic or methacrylic acid. A more specific object of the invention is to provide a process for the polymerization of the esters of acrylic and methacrylic acids while in emulsified or dispersed form and in the presence of a polymerized compound or derivative of the monomer being polymerized. Other objects and advantages of the invention will hereinafter appear.

I have found that monomeric polymerizable compounds can be converted to high strength polymers, even when a dispersing or an emulsifying agent is present, if the polymerization be effected in the presence of a suitable dispersing or emulsifying agent to effect subdivision of the monomer while it is being polymerized. This highly advantageous result can be obtained by employing as the emulsifying agent a compound which is a water soluble derivative of acrylic or methacrylic acid.

It is immaterial whether the monomeric compound be ultimately converted to the polymer as a gum-like material as the result of emulsion polymerization and ultimate coagulation, or as a granular or globular powder resulting from polymerization in granular form, for in either instance it will be found that if emulsifying agents, which will hereinafter be more fully particularized, are used a resin of excellent strength will be produced.

My process differs from the prior art in that I employ as an emulsifying agent, dispersing agent, or colloid, a compound which is a water soluble derivative of acrylic or methacrylic acid. The type of emulsifying agent which should be used will be determined by the kind of monomeric compound being polymerized. Generally speaking, I prefer to employ a homologue or derivative of the monomer being polymerized, although other emulsifying agents which are suitable thermoplastics, under the conditions at which the resin is to be molded, may be employed; or, in other words, the emulsifying or dispersing agent should give in a liquid mixture containing the monomer to be polymerized and a non-solvent therefor, a good emulsion, if the emulsified polymer is to be obtained, or, a proper dispersion, if the granular polymer is to be obtained.

For the polymerization of acrylic acid esters and homologues in accord with my invention the following emulsifying and granulating agents, many of which are also lyophilic colloids, i. e. colloids which have an affinity for the dispersing medium, may be employed: polymeric acrylic acid, polymeric acrylamide, polymeric acrylic acid salts, such as polymeric sodium acrylate, polymeric ammonium acrylate, etc. For the polymerization of the esters of methacrylic acid there may be employed as emulsifying and/or granulating agents polymethacrylamide, polymethacrylimide, polymeric methacrylic acid, acetate of polymerized diethyl amino ethyl methacrylate, volatile acid salts of the amino alcohol methacrylates, such as are described in U. S. appl. Ser. No. 21,807 filed May 16, 1935, polymeric methacrylic acid salts, e. g. polymeric sodium methacrylate, polymeric ammonium methacrylate, the polyalkyl ammonium methacrylate, e. g. mono-, di-, tri-, and tetramethylammonium methacrylates or acrylates, etc. Generally speaking, thermoplastic lyophilic compounds are suitable for use in my process and particularly such compounds that have equal or greater hardness and/or toughness than the polymerized resin.

I shall now illustrate by way of example several methods of conducting my process, but it will be understood that my invention shall not be restricted to the details therein given except as it may be limited by the claims appended hereto.

*Example 1.*—50 parts of acrylic acid ethyl ester are emulsified, by stirring, in 100 parts of water containing 1% of polymeric acrylic acid amide. The emulsion is heated while stirring for 12 hours and from 75–85° C., under a reflux condenser. The emulsion is freed from the last traces of the unpolymerized ester by treating with steam and the product may be coagulated, if desired, by pouring into a 4% solution of hydrochloric acid, after which it may be washed to remove the hydrochloric acid, whereupon a product is obtained soluble in acetone and the lower alkyl and aryl acetates.

*Example 2.*—50 parts of styrene and 50 parts of monomeric-acrylic acid ethyl ester are emulsified, by stirring, in 200 parts of water in the presence of polymerized sodium acrylate. The polymerization is effected at approximately room temperature and requires in the neighborhood of approximately 20 days to give a rather completely polymerized product which is poured into aqueous 4% hydrochloric solution to coagulate and which is soluble in usual organic solvents, such as benzene and the lower alkyl acetates. The product is considerably tougher than when ordinary emulsifying agents, which is no doubt due to the fact that the dispersing agent is chemically related to the substance being polymerized.

*Example 3.*—562 parts of a 5% aqueous solution of water soluble polymethacrylamide were freed from suspended insoluble matter by centrifuging and were then diluted with 5000 parts of water. This solution was added to 2270 parts of methyl methacrylate monomer containing 22.7 parts of benzoyl peroxide and the mixture was placed in an enameled cast iron jacketed vessel fitted with reflux condenser, and a mechanical stirrer with a water seal. Stirring was commenced and the reaction carried out at approximately 80° C.; when the bulk of the reaction had taken place, the vessel was heated thru a steam jacket and the temperature of the reaction raised to the neighborhood of 90° C., to insure complete polymerization of the methyl methacrylate.

The solid product is separated by decantation and centrifuging and dried at a temperature of 90° C., giving a white sand-like powder, which upon molding at a temperature of approximately 150–180° C., and a pressure of 4000 lbs./sq. in. gives a product having high strength.

*Example 4.*—A mixture containing one volume of methyl methacrylate and two volumes of 28–29% aqua ammonia was allowed to stand with periodic shaking for 2–3 days at room temperature. The resulting homogeneous solution was concentrated to one-half its volume by distillation at 100–125 mm. pressure. The water distilled off was replaced by an equal volume of distilled water and the pH of the resulting solution lowered to approximately 5.0 by the addition of glacial acetic acid. The resulting solution was placed for from 3–5 days in an oven maintained at approximately 60° C. A thick gel-like resin resulted.

*Example 5.*—A glass-lined jacketed kettle of 50 gallons capacity provided with a stirrer and a reflux condenser was charged with 25 gallons of water and 5 gallons of monomeric methyl methacrylate containing 1% (based on weight of monomer) of benzoyl peroxide and 0.8 of 1% (based on monomer) of the gel-like resin obtained under Example 3, together with 18 grams of $Na_2HPO_4.12H_2O$. per gallon of water and 0.94 grams of $NaH_2PO_4.H_2O$ per gallon of water. A T-shaped stirrer was revolved at 550 R. P. M., giving a fairly deep vortex and the temperature raised and maintained at approximately 80° C. After approximately 1 hour the polymerization was complete and a granular polymer separated and washed with distilled water. Upon molding under a temperature of 170° C., and 3000 lbs./sq. in. a resin having excellent strength was obtained.

*Example 6.*—Approximately 0.6% of polymeric methacrylamide was dissolved in 2000 parts by weight of water followed by 0.25 grams of sodium hydroxide. After being heated with stirring to 70° C., 500 parts by weight of methyl methacrylate containing 1% of zenzoyl peroxide was added and the temperature increased to 82° C. and maintained at this temperature for the 55 minutes required for polymerization. During the entire polymerization a T-type stirrer was rotated at 650 R. P. M. After polymerization had taken place, the polymer suspension was heated at 80–85° C., for ½ hour before being cooled. The supernatant liquid was siphoned off, the granular polymer washed several times with hot water, filtered and dried at 90–95° C. Upon molding at a temperature of 150° C. and 3800 lbs./sq. in. a resin having a good strength was obtained.

*Example 7.*—A solution containing sodium polymethacrylate was made by reacting 5 parts of polymeric methacrylic acid in 150 parts of water followed by 2 parts of sodium hydroxide. This dispersing agent was added to 2000 parts by weight of water and heated with stirring to 75° C. 500 parts by weight of methyl methacrylate was then added which contained 1% by weight of benzoyl peroxide. After the temperature had been raised to 82° C., polymerization was over in one hour. The temperature was held at 82–85° C., for an additional 15 minutes before cooling, filtering and washing the granular polymer. Upon molding a resin having unusual strength was obtained.

It has been emphasized that my process is applicable primarily to the polymerization of polymerizable compounds which are normally solid at ordinary temperature. Among the additional compounds which can be advantageously polymerized by my process and which may be prepared in accord with the processes disclosed in U. S. Patents 1,993,089, 2,013,648, and 2,020,685 are: esters, nitriles, and amides of acrylic acid, e. g. ethyl, methyl, propyl, butyl, and the higher acrylates; the esters, nitriles and amides of methacrylic acid, e. g. methyl, ethyl, propyl, butyl, and amyl methacrylates; the higher alkyl methacrylates such as nonyl, decyl, and lauryl methacrylates, the primary, secondary, and tertiary straight or branch chain saturated or unsaturated alcohol esters of methacrylic or the other alkacrylic acids; and the acids per se, i. e. acrylic acid and methacrylic acid. These compounds may, if desired, be polymerized alone or admixed with each other or with vinyl compounds, such, for example, as the vinyl halides, vinyl chloride, and the vinyl esters, such as vinyl monochloracetate, the solid styrols conforming generally to the formula ArCH:CH$_2$. In many instances the vinyl type compounds may also be advantageously polymerized in accord with my process. I have stressed the advantages of utilizing my process for the polymerization of compounds which give solid resins principally because molded products so prepared from such resins have better strength. It is to be understood, nevertheless, that my process may likewise be used, if desired, for the polymerization of products which are not solids under normal conditions. The advantages of additional strength will not be obtained, altho that advantage may be offset by homogeneity and/or clarity of the finished resin.

When utilizing as emulsifying agents or colloids the polyamides, such as polymethacrylamide, in aqueous solutions, it has been found that in order to obtain the granular products of great clarity, such as those obtained in Examples 5 and 6, a buffer should be employed to maintain the pH of the solution between pH 5.5 and pH 8. As indicated in Example 6, sodium hydroxide may be used for this purpose, but it has been found that it is not quite as suitable as sodium phosphate, given in Example 5, for the reason that if sodium hydroxide be employed in a high enough concentration to give at the completion of the polymerization a pH of 11, which has the disadvantage that it corrodes glass or glass-lined equipment. Sodium hydroxide and equivalent strong alkalis may be used, however, if they be periodically added during the reaction. If metal vessels are used, which are not attacked by caustic, particularly while polymerizing the esters of methacrylic acid in accord with the process of Examples 5 and 6, the polymer often adheres firmly to the walls of said vessels, resulting in considerable difficulty in its removal. Consequently I generally prefer to employ enameled vessels and as buffers such compounds as the sodium phosphates, borates, oxalates, tartrates, etc., which do not attack enamel and maintain the pH within the desired range.

It will be understood that in the specification and the claims appended thereto the words "disperse", "dispersed", "dispersion" and the like are used in accord with the sense employed in colloidal chemistry, that is, to designate a quasi-homogeneous product such as the result of mixing one immiscible fluid or one or more fluids with a finely divided solid insoluble therein.

From a consideration of the above specification it will be appreciated that many improvements and modifications of the details therein given may be made without sacrificing the advantages derived from the invention.

I claim:

1. In a process for the polymerization of monomeric methyl methacrylate in granular form the steps which comprise dispersing approximately 5 parts of monomeric methyl methacrylate in 25 parts of water containing approximately 0.3 of 1 part of a gel like resin obtained by polymerizing the product of the reaction between methyl methacrylate and aqua ammonia, and subsequently polymerizing the resulting dispersion while stirring.

2. A process for the polymerization of methyl methacrylate which comprises effecting the polymerization of the methyl methacrylate in water containing as a dispersing agent polymerized methacrylamide.

3. A process for the polymerization of methyl methacrylate which comprises effecting the polymerization of the methyl methacrylate in water and a dispersing agent which is a water-soluble polymeric compound of the group consisting of acrylic acid, its amide and salts and methacrylic acid, its amide, imide and salts while in a solution buffered to a pH of 5.5 to 8.0.

4. A process for the polymerization of methyl methacrylate which comprises effecting the polymerization of the methyl methacrylate in water containing as dispersing agent polymeric methacrylamide the pH of which is maintained between 5.5 and 8.0.

5. A new composition of matter comprising methyl methacrylate in granular form, each granule of which is encased in polymethacrylamide.

6. In a process for the polymerization of methyl methacrylate while dispersed by means of a polymethacrylamide the step which comprises effecting the reaction in a solution the pH value of which is maintained between 5.5 and 8.0 by the addition of a compound selected from the group consisting of sodium phosphates, borate, oxalates, and tartrates.

7. A process for the polymerization of methyl methacrylate which comprises effecting the polymerization of the methyl methacrylate in water containing as a dispersing agent an alkali metal salt of polymethacrylic acid.

8. In a process for the polymerization of methyl methacrylate the steps which comprise dispersing monomeric methyl methacrylate in water by means of sodium polymethacrylate as the dispersing agent and subsequently polymerizing the thus dispersed methyl methacrylate by heating it to a temperature of approximately 80° C.

9. A new composition of matter comprising methyl methacrylate in granular form each granule of which is encased in sodium polymethacrylate.

10. A process for the polymerization of methyl methacrylate which comprises dispersing monomeric methyl methacrylate in an aqueous solution containing benzoyl peroxide and sodium polymethacrylate and raising the temperature to approximately 82° C. to polymerize the ester.

11. In a process for polymerizing monomeric methacrylic acid compounds while dispersed in a non-solvent of the monomeric and polymeric compounds, the step which comprises utilizing as the dispersing agent a polymeric compound of the group consisting of acrylic acid, its amide and salts and methacrylic acid, its amide, imide and salts, which is soluble in the non-solvent medium.

12. In a process of polymerizing monomeric methacrylic acid compounds while dispersed in water, the step which comprises utilizing as the dispersing agent a water-soluble polymeric compound of the group consisting of acrylic acid, its amide and salts and methacrylic acid, its amide, imide and salts.

13. In a process of polymerizing monomeric methyl methacrylate while dispersed in water, the step which comprises utilizing as the dispersing agent a water-soluble polymeric compound of the group consisting of acrylic acid, its amide and salts and methacrylic acid, its amide, imide and salts.

14. A new composition of matter comprising polymeric methyl methacrylate in granular form, each granule of which is incased in a film of a polymeric compound of the group consisting of acrylic acid, its amide and salts and methacrylic acid, its amide, imide and salts.

15. In a process for the polymerization of methyl methacrylate while dispersed in water, by means of polymethacrylamide as the dispersing agent, the step which comprises effecting the polymerization in a solution, the pH value of which is maintained between 5.5 and 8.0.

16. In a process of polymerizing a monomeric compound selected from the group consisting of acrylic acid and its esters, nitriles and amides and alphamethyl acrylic acids and their esters, nitriles and amides, while dispersed in a non-solvent medium of both the monomeric and the polymeric compound, the steps which comprise utilizing as the dispersing agent a polymeric compound of the group consisting of acrylic acid, its amide and salts and methacrylic acid, its amide, imide and salts, which compound is soluble in the non-solvent medium.

17. In a process of polymerizing a monomeric acrylic acid compound while dispersed in a non-solvent medium for both the monomeric and polymeric compound, the steps which comprise utilizing as the dispersing agent a polymeric compound of the group consisting of acrylic acid, its amide and salts and methacrylic acid, its amide, imide and salts, which compound is soluble in a non-solvent medium.

18. In a process of polymerizing a monomeric methacrylic acid compound while dispersed in a non-solvent medium for both the monomeric and polymeric compound, the steps which comprise utilizing as the dispersing agent a polymeric compound of the group consisting of acrylic acid, its amide and salts and methacrylic acid, its amide, imide and salts, which compound is soluble in a non-solvent medium.

19. In a process of polymerizing a monomeric compound of the group consisting of acrylic acid, methacrylic acid, their esters, nitriles and amides, in finely comminuted form, the step which comprises dispersing the monomeric organic compound in water with an alkali metal salt of polymethacrylic acid as the dispersing agent, and subsequently polymerizing the monomer while thus dispersed.

20. A new composition of matter comprising a polymeric compound of the group consisting of acrylic acid, methacrylic acid, their esters, nitriles and amides in granular form, each granule of which is incased in a film of a dissimilar polymeric compound of the group consisting of acrylic acid, its amide and salts and methacrylic acid, its amide, imide and salts.

DANIEL E. STRAIN.